(12) United States Patent
Wang

(10) Patent No.: US 7,129,426 B1
(45) Date of Patent: Oct. 31, 2006

(54) WEIGHT SCALE WITH HYBRID GRADUATION

(76) Inventor: Huang-Lin Wang, No. 9, Nan-Chin 1st Street, Fengshan City, Kaohsiung Hsien (TW)

(*) Notice: Subject to any disclaimer, the term of this patent is extended or adjusted under 35 U.S.C. 154(b) by 0 days.

(21) Appl. No.: 11/230,171

(22) Filed: Sep. 19, 2005

(51) Int. Cl.
  *G01G 23/01* (2006.01)
  *G01G 23/20* (2006.01)

(52) U.S. Cl. .............. 177/173; 177/186; 177/232; 177/234; 73/1.13

(58) Field of Classification Search ............... 177/173, 177/186, 232–234; 73/1.13, 1.15
See application file for complete search history.

(56) References Cited

U.S. PATENT DOCUMENTS

| 67,482 A | 8/1867 | Barker |
| 273,720 A | 3/1883 | George |
| 479,718 A * | 7/1892 | Morgan et al. ............. 177/232 |
| 629,290 A | 7/1899 | Goodbaudy |
| 739,035 A | 9/1903 | Triner |
| 756,175 A | 3/1904 | Meisselbach et al. |
| 1,063,242 A | 6/1913 | Catucci |
| 1,095,735 A | 5/1914 | Lupton |
| 2,193,212 A * | 3/1940 | Vincent ....................... 116/334 |
| 2,650,494 A * | 9/1953 | Linhorst ....................... 73/437 |
| 3,229,780 A * | 1/1966 | Hanssen ....................... 177/233 |
| 4,964,479 A | 10/1990 | Sumida ....................... 177/233 |
| 5,576,521 A * | 11/1996 | Dubach ....................... 177/233 |
| 6,246,017 B1 | 6/2001 | Yang ........................... 177/148 |
| 6,649,850 B1 | 11/2003 | Strohmeier ................. 177/232 |

* cited by examiner

*Primary Examiner*—Randy W. Gibson
(74) *Attorney, Agent, or Firm*—Alan D. Kamrath; Nikolai & Mersereau, P.A.

(57) ABSTRACT

A weight scale with hybrid graduation includes an elastic element, a carrier mounted to the lower end of the elastic element, an indicator block mounted between the elastic element and the carrier, and a graduated housing for receiving the elastic element and the indicator block. The indicator block includes at least one auxiliary graduation. The graduated housing includes at least one primary graduation having a unit different from that of the auxiliary graduation. A weight of an object attached to the carrier is measured through vertical relative movement between the primary graduation and the auxiliary graduation to provide more accurate measuring result.

14 Claims, 9 Drawing Sheets

WEIGHT SCALE WITH HYBRID GRADUATION

BACKGROUND OF THE INVENTION

1. Field of the Invention

The present invention relates to a weight scale with hybrid graduation. More particularly, the present invention relates to a weight scale having two or more graduations.

2. Description of Related Art

U.S. Pat. No. 6,246,017 discloses a portable scale comprising a housing with a slot and a graduation, a cap threadedly secured to a lower portion of the housing, a stem engaged through the cap and including a lower portion having a hook provided thereon for engaging with an object to be weighed, a head engaged on an upper portion of the stem that is slidably received in the housing, and a spring for biasing the head and the upper portion of the stem away from the cap.

An indicator is secured to the head that moves in concert with the stem for aligning with the graduation for indicating the weight of the object. A follower is slidably engaged in the slot of the housing and moved by the indicator when an object is placed on the hook for weighing purposes. The follower may stay at the position and will not be moved relative to the housing without any external force, such that the user may easily read the weight of the object even when the object has been removed from the portable scale.

When the indicator points at a position between two marks for the one unit of the portable scale, the user has to estimate the weight of the object with his or her eyes, leading to limitation in precision. Further, the portable scale has many elements and is thus too complicated, leading to an increase in the manufacturing cost and to inconvenient assembling procedures.

OBJECTS OF THE INVENTION

An object of the present invention is to provide a weight scale with hybrid graduation having improved weighing accuracy.

Another object of the present invention is to provide a weight scale with hybrid graduation allowing zeroing.

SUMMARY OF THE INVENTION

A weight scale with hybrid graduation in accordance with the present invention comprises an elastic element, a carrier mounted to the lower end of the elastic element, an indicator block mounted between the elastic element and the carrier, and a graduated housing for receiving the elastic element and the indicator block.

The indicator block comprises at least one auxiliary graduation. The graduated housing comprises at least one primary graduation having a unit different from that of the auxiliary graduation. A weight of an object attached to the carrier is measured through vertical relative movement between the primary graduation and the auxiliary graduation. The measuring accuracy is improved. The weight scale with hybrid graduation may further include a zeroing means. Further, the number of elements of the weight scale with hybrid graduation is reduced and thus simplifies the structure, allowing easy assembly and cutting the manufacturing cost.

Other objects, advantages and novel features of this invention will become more apparent from the following detailed description when taken in conjunction with the accompanying drawings.

DETAILED DESCRIPTION OF THE PREFERRED EMBODIMENTS

Figure 1:
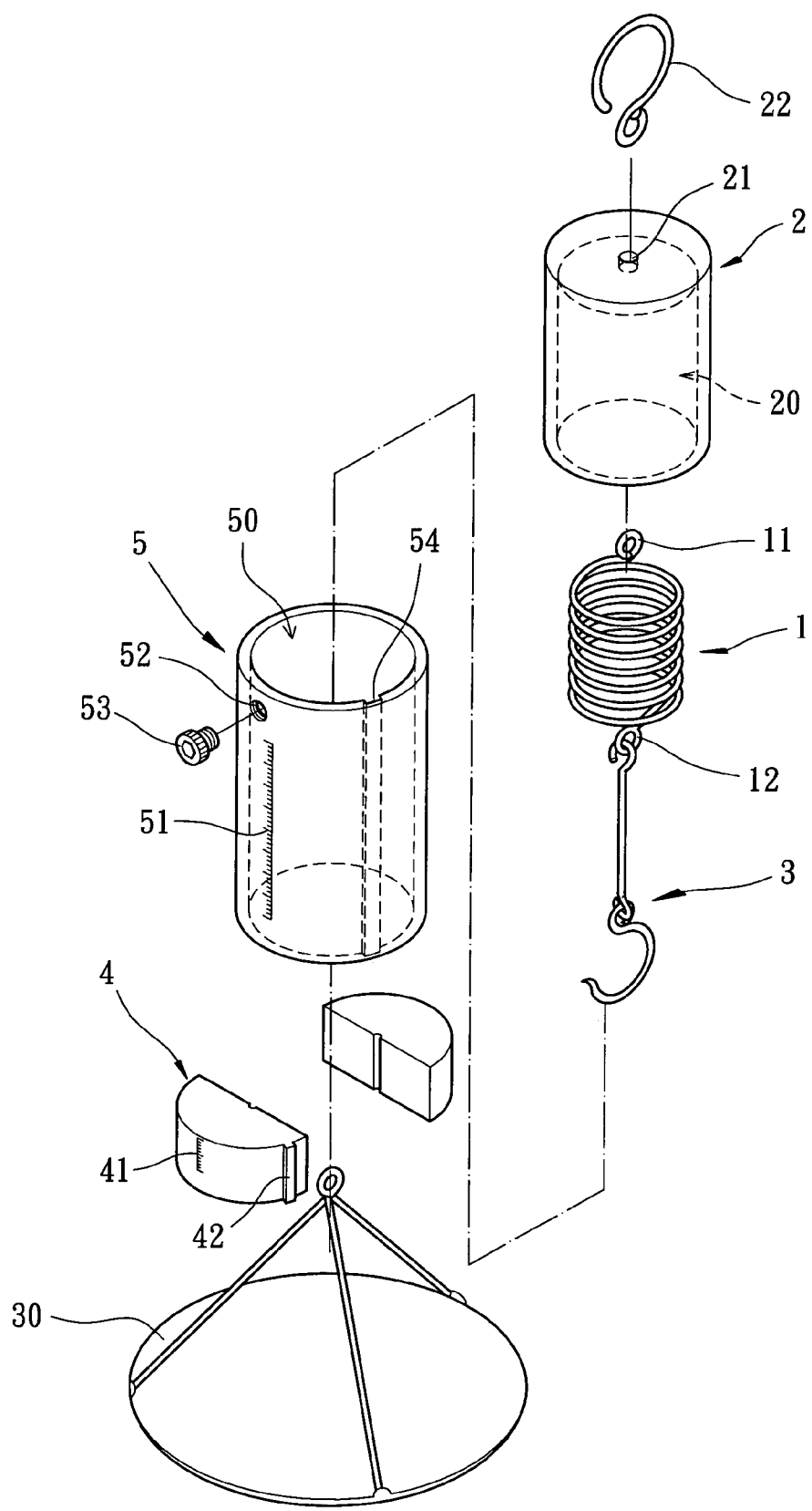
FIG. 1 is an exploded perspective view of a first embodiment of a weight scale with hybrid graduation in accordance with the present invention.
Figure 2:
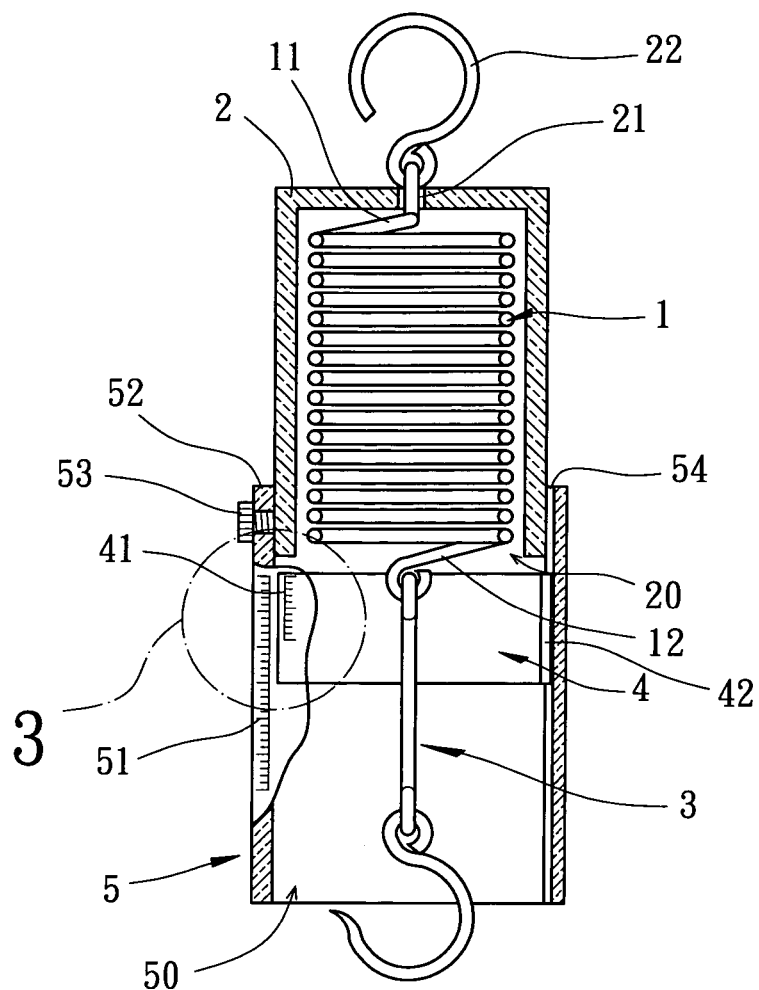
FIG. 2 is a sectional view of the weight scale with hybrid graduation in FIG. 1.

Referring to FIGS. 1 and 2, a first embodiment of a weight scale with hybrid graduation in accordance with the present invention comprises an elastic element 1, a supporting housing 2, a carrier 3, an indicator block 4, and a graduated housing 5. The elastic element 1 is received in the supporting housing 2 and includes an upper end 11 and a lower end 12. The upper end 11 of the elastic element 1 is coupled to an inner face of a top end of the supporting housing 2. The carrier 3 and the indicator block 4 are attached to the lower end 12 of the elastic element 12.

Still referring to FIG. 1, the supporting housing 2 in this embodiment is substantially cylindrical and comprises a compartment 20 for accommodating the elastic element 1. A mounting hole 21 is defined in the top end of the supporting housing 2, with the upper end 11 of the elastic element 1 extending through the mounting hole 21, and with an attachment member 22 attached to the upper end 12 of the elastic element 1. The attachment member 22 is in the form of a hook to allow hanging of the weight scale with hybrid graduation. The shape or form of the attachment member 22 may be selected according to need, e.g., the attachment member 22 may be a rope to reduce the volume for easy storage. A lower end of the attachment member 22 is extended through the upper end 12 of the elastic element 1. Further, the attachment member 22 can be engaged with the elastic element 1 and the supporting housing 2 in any other suitable ways. Further, the elastic element 1 has a shape corresponding to that of the compartment 20 of the supporting housing 2, with an appropriate radial tolerance provided between the elastic element 1 and the supporting housing 2, allowing stable vertical movement of the elastic element 1 in the supporting housing 2.

Still referring to FIG. 1, the carrier 3 includes an upper end for coupling with the lower end 12 of the elastic element 1 and a lower end to which a hanging pan 30 (FIG. 4) is attached. The shape and form of the carrier 3 and/or the hanging pan 30 may be selected according to need. Alternatively, the carrier 3 and the hanging pan 30 can be formed integrally. Optionally, the carrier 3 can be easily detached from the lower end 12 of the elastic element 1 to reduce the volume for storage and to allow easy carriage.

Still referring to FIG. 1, the indicator block 4 of this embodiment is substantially cylindrical and fixed to the carrier 3 at an appropriate position. The indicator block 4 is received in the graduated housing 5 and includes an auxiliary graduation 41 for assisting in measurement. Further, the indicator block 4 has a shape corresponding to that of the compartment 20 of the supporting housing 2. Preferably, an appropriate radial tolerance is provided between an outer wall face of the indicator block 4 and an inner wall face of the supporting housing 2, allowing stable vertical movement of the indicator block 4 in the compartment 20 of the supporting housing 2. Further, the indicator block 4 may be attached to the carrier 3 by any suitable means according to need.

Still referring to FIG. 1, the graduated housing 5 in this embodiment is substantially cylindrical and includes a compartment 50, a primary graduation 51, a positioning hole 52, and a positioning member 53. The compartment 50 of the graduated housing 5 accommodates at least a portion of the supporting housing 2, the elastic element 1, and the indicator block 4. The primary graduation 51 of the graduated housing 5 and the auxiliary graduation 41 of the indicator block 4 together provide measurement of a weight of an object.

The positioning hole 52 is a through-hole extending through a circumferential wall of the graduated housing 5. The positioning member 53 includes an outer threading (not labeled) for threadedly engaging with an inner threading (not labeled) of the positioning hole 52. The positioning member 53 is extended through the positioning hole 52, with a front end of the positioning member 53 extending into the compartment 50 of the graduated housing 5 for frictional contact with an outer wall face of the supporting housing 2 for retaining the supporting housing 2 in place (see FIG. 2).

Still referring to FIG. 1, the graduated housing 5 of this embodiment is preferably transparent or translucent so that the auxiliary graduation 41 can be seen via the graduated housing 5. Nevertheless, in a case that the graduated housing 5 is made of a non-transparent material, the graduated housing 5 may include a longitudinal slot (not shown) so that the auxiliary graduation 41 can be seen via the longitudinal slot of the graduated housing 5.

Preferably, an appropriate radial tolerance is provided between the graduated housing 5 and the supporting housing 2, allowing stable relative vertical movement between the graduated housing 5 and the supporting housing 2. Further, a longitudinal groove 54 may be defined in an inner wall face of the graduated housing 5, and a longitudinal rib 42 may be formed on the outer wall face of the indicator block 4 and engaged in the longitudinal groove 54 of the graduated housing 5, allowing stable vertical movement of the indicator block 4 relative to the graduated housing 5 and thus assuring the auxiliary graduation 41 of the indicator block 4 is always near the primary 15 graduation 51 of the graduated housing 5 for the purposes of accurately reading of he primary graduation 51 and the auxiliary graduation 41. Further, for storage of the weight scale with hybrid graduation in accordance with the present invention, the supporting housing 2 is completely received in the graduated housing 5 and thus has a relatively shorter overall length for convenient carriage while allowing ready use.

Figure 3:
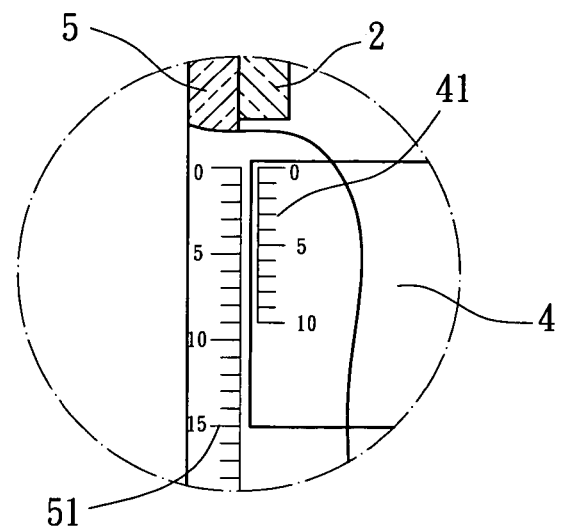
FIG. 3 is an enlarged view of a circled portion in FIG. 2.

Referring to FIGS. 1 through 3, in assembly, the upper end 11 of the elastic element 1 is extended through the mounting hole 21 of the supporting housing 2 for coupling with the attachment member 22. Then, the lower end 12 of the elastic element 1 is engaged with the upper end of the carrier 3. Next, the indicator block 4 is fixed to the carrier 3 at an appropriate location. Then, the graduated housing 5 is mounted around the supporting housing 2, and vertical adjustment between the graduated housing 5 and the supporting housing 2 is proceeded until a zero of the auxiliary graduation 41 of the indicator block 4 is aligned with a zero of the primary graduation 51 of the graduated housing 5, as shown in FIG. 3. The positioning member 53 is then extended through the positioning hole 52 for pressing against the outer wall face of the supporting housing 2, thereby retaining the graduated housing 5 on the supporting housing 2. The user may be aware of the difference between the unit of the primary graduation 51 of the graduated housing 5 and the unit of the auxiliary graduation 41 of the indicator block 4. The measurement and calculation of the weight of the object to be weighed by the weight scale with hybrid graduation in accordance with the present invention will be described in detail later.

Figure 4:
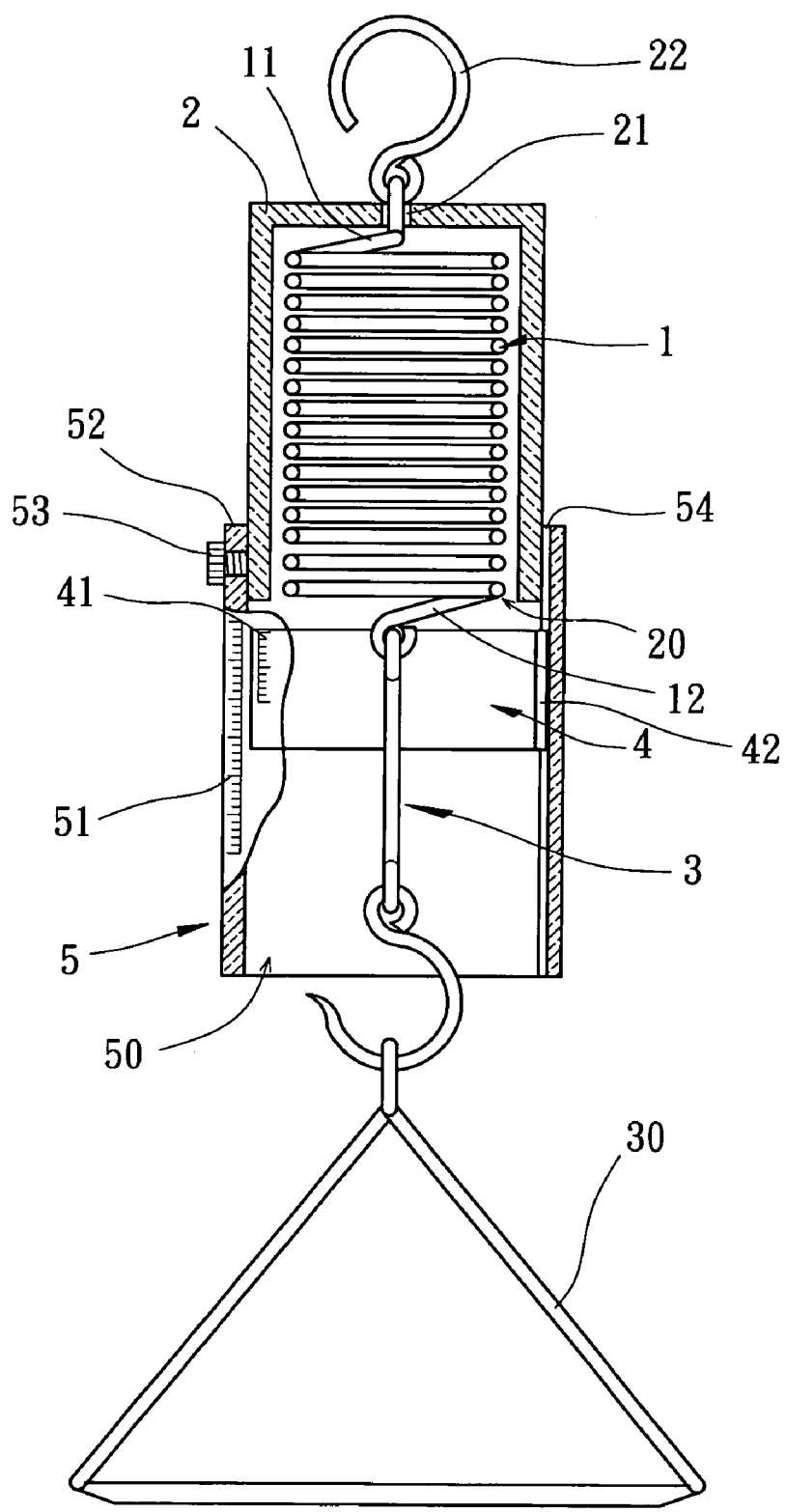
FIG. 4 is a sectional view similar to FIG. 2, wherein a hanging pan is attached to the weight scale with hybrid graduation.

Referring to FIG. 4, in a case that a hanging pan 30 is hung on the carrier 3, the indicator block 4 moves downward while the elastic element 1 is stretched downward. The zero of the auxiliary graduation 41 of the indicator block 4 is not aligned with that of the primary graduation 51 of the graduated housing 5. Since the zero of the auxiliary graduation 41 of the indicator block 4 can be deemed as a movable indicator for reading the weight value from the primary graduation of the graduated housing 5, pre-weighing zeroing is required.

Figure 5:
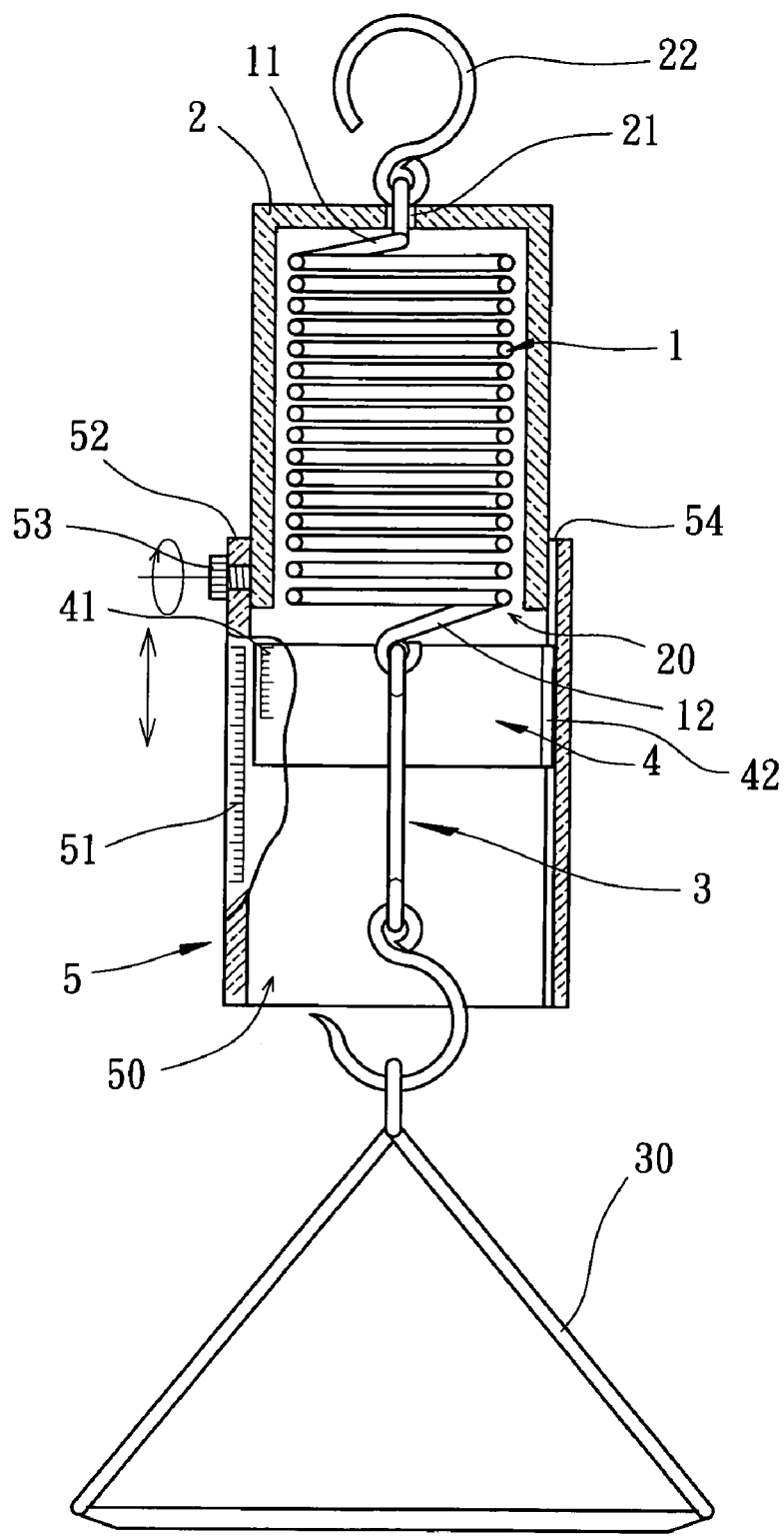
FIG. 5 is a sectional view similar to FIG. 4, illustrating zeroing operation of the weight scale with hybrid graduation.

Referring to FIG. 5, when zeroing, the positioning member 53 is loosened to allow relative vertical movement between the graduated housing 5 and the supporting housing 2 until the zero of the auxiliary graduation 41 of the indicator block 4 is realigned with the zero of the primary graduation 51 of the graduated housing 5. The positioning member 53 is then tightened again to accomplish the zeroing operation.

The zeroing structure of the weight scale with hybrid graduation in accordance with the present invention may vary according to need. For example, the supporting housing 2 may be omitted, the graduated housing 5 may include a screw hole (not labeled) in an upper end thereof, and the upper end 11 of the elastic element 1 may include a threaded portion (not shown) for threadedly engaging with the screw hole of the graduated housing 5 for the purposes of adjusting the vertical relative position between the graduated housing 5 and the elastic element 1. Thus also allows realignment between the zero of the auxiliary graduation 41 of the indicator block 4 and the zero of the primary graduation 51 of the graduated housing 5 for zeroing operation.

Figure 6:
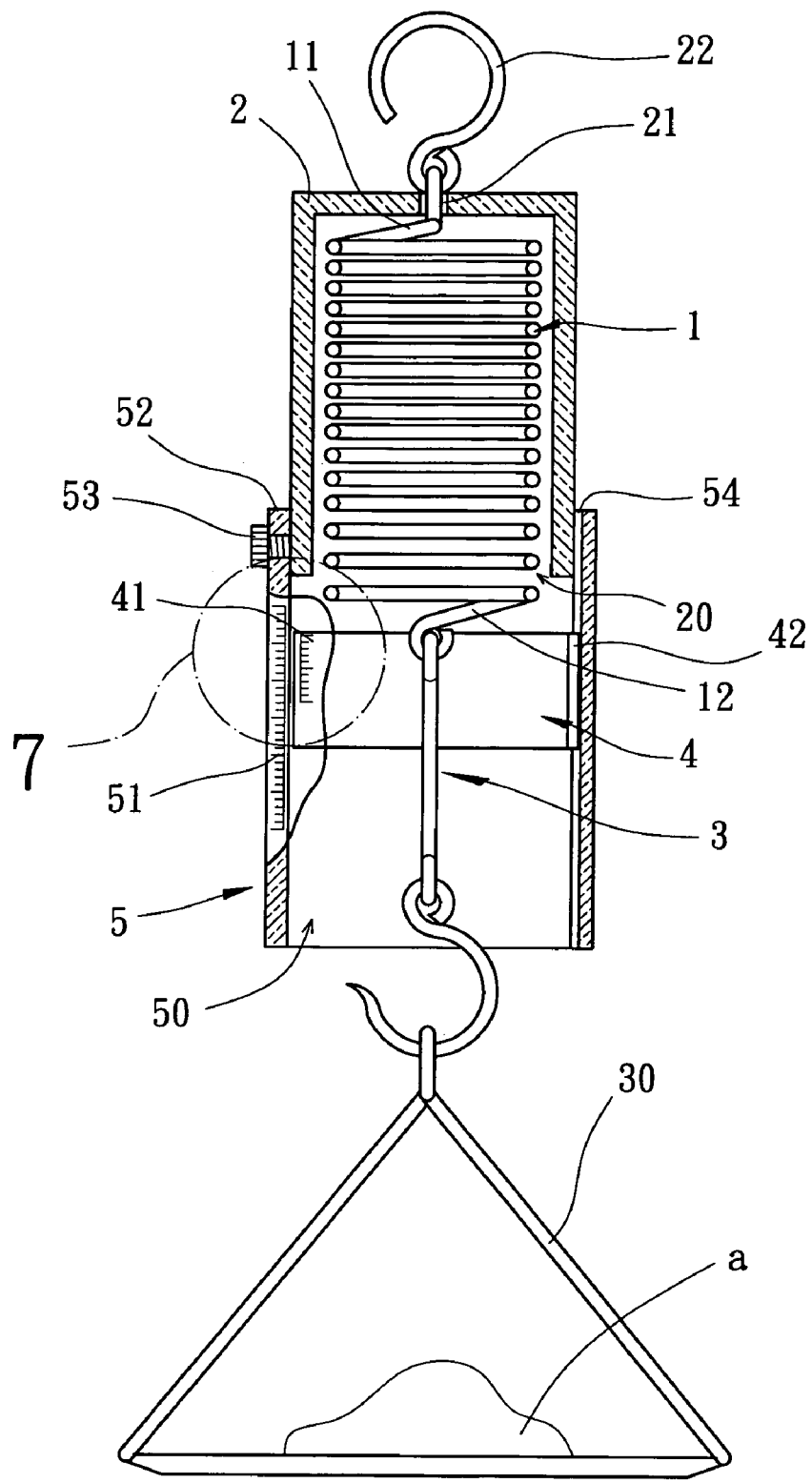
FIG. 6 is a view similar to FIG. 5, illustrating weighing operation.
Figure 7:
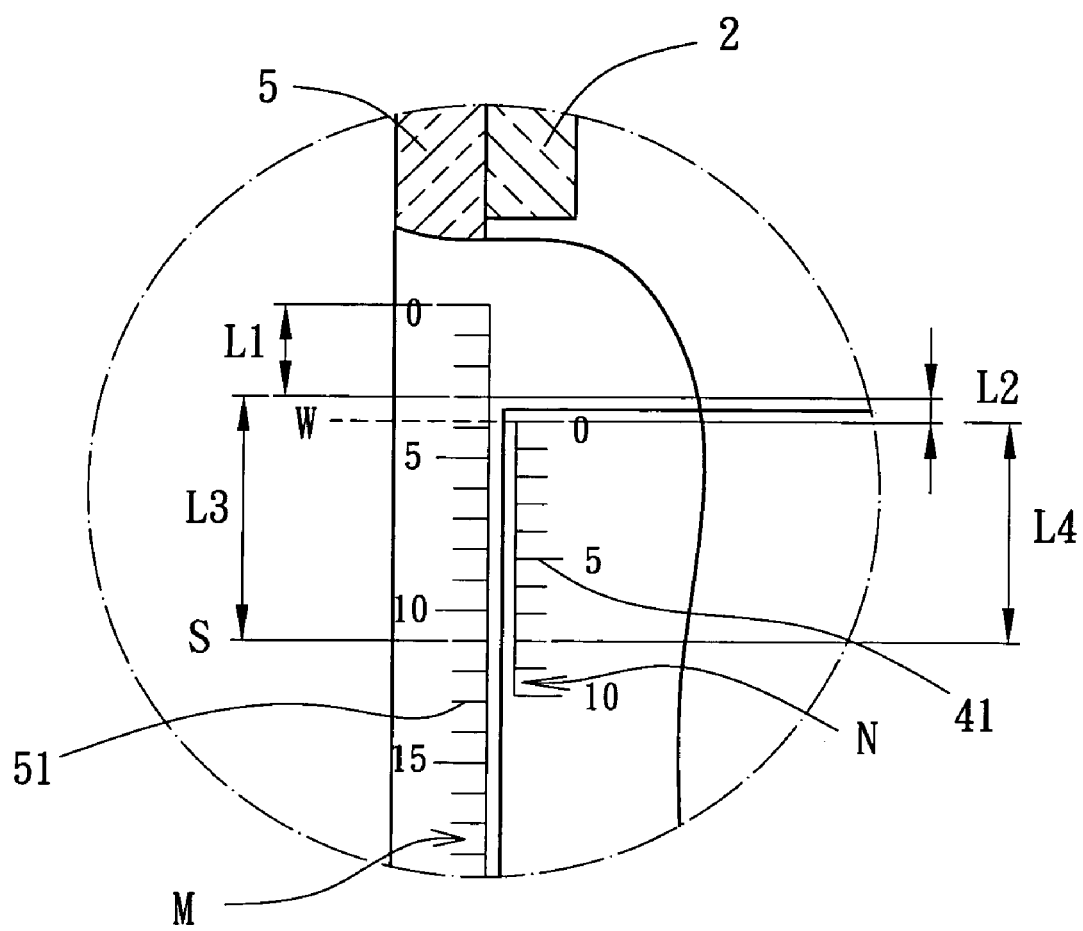
FIG. 7 is an enlarged view of a circled portion in FIG. 6.

Referring to FIGS. 6 and 7, when weighing an object "a", the object "a" is placed on the hanging pan 30, which causes downward stretching of the elastic element 1 as well as downward movement of the indicator block 4. The position pointed by the zero of the auxiliary graduation 41 of indicator block 4 on the primary graduation 51 of the graduated housing 5 is the weight W of the object "a", as shown in FIG. 7.

Calculation of the actual weight W of the object will now be described. Assume that the following equation (1) is true for the weight scale with hybrid graduation in accordance with the present invention:

$$(n-1)*M = n*N \qquad (1)$$

wherein M is one graduation unit of the primary graduation 51, N is one graduation unit of the auxiliary graduation 41.

The difference D between M and N can be calculated by the following equation (2):

$$D = M - N = M - (1 - 1/n)*M = (1/n)*M \quad (2)$$

Referring to FIG. 7, the actual weight W of the object "a" can be expressed by the following equation (3):

$$W = L1 + L2 \quad (3)$$

wherein L1 is the precise graduation value read by the user's eyes from the primary graduation 51, and L2 is the difference between L1 and the actual weight W, i.e., the section that could not be accurately read by the user's eyes.

Still referring to FIG. 7, L2 can be expressed as follows:

$$L3 = L2 + L4 \quad (4)$$

Thus, $L2 = L3 - L4$ \quad (5)

It can be seen that the primary graduation 51 and the auxiliary graduation 41 align with each other at graduation value S. Assume that the graduation value S is the m-th graduation mark of the auxiliary graduation 41, since the difference L2 between L3 and L4 is smaller than one unit M of the primary graduation 51, L3 is equal to m*M. Namely, L4 and L3 can be expressed as follows:

$$L4 = m*N \quad (6)$$

$$L3 = m*M \quad (7)$$

The actual weight W of the object "a" (FIG. 6) can be expressed as follows:

$$\begin{aligned}
W &= L1 + L2 \\
&= L1 + (L3 - L4) \\
&= L1 + (m*M - m*N) \\
&= L1 + m*(M - N) \\
&= L1 + m*D \\
&= L1 + m*(1/n)*M \\
&= L1 + (m/n)*M
\end{aligned}$$

Still referring to FIG. 7, in this example, m is eight (8) and n is ten (10). In other words, the following equation is obtained after replacing m=8 and n=10 into equation (1):

$$(10-1)*M = 10*N$$

Thus, the actual weight W of the object "a" is obtained as follows:

$$\begin{aligned}
W &= L1 + L2 \\
&= 3\ M + (8/10)*M \\
&= 3\ M + 0.8\ M \\
&= 3.8\ M
\end{aligned}$$

In a case that the unit M is 1 kilogram (1 g), then W is 3.8 g. Namely, the measuring precision of the weight W of the object "a" is 0.1 g. If the unit M is 0.1 g, then W is 0.38 g. Namely, the measuring precision of the weight W of the object "a" is 0.01 g. Thus, the weight scale with hybrid graduation in accordance with the present invention provides more accurate measurement for objects.

Figure 8:
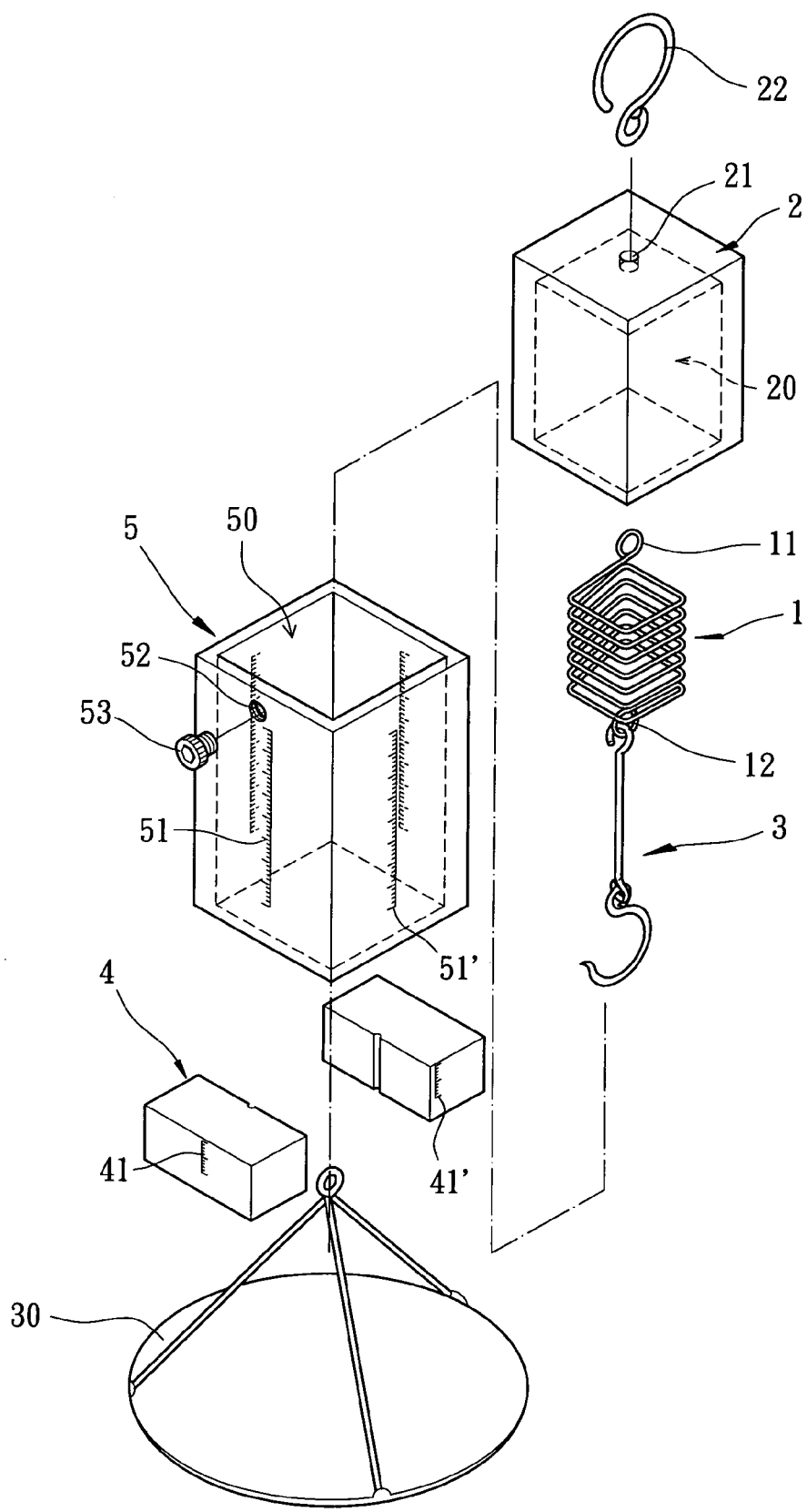
FIG. 8 is an exploded perspective view illustrating a second embodiment of the weight scale with hybrid graduation in accordance with the present invention.

FIG. 8 illustrates a second embodiment of the weight scale with hybrid graduation in accordance with the present invention, wherein the elastic element 1, the supporting housing 2, the indicator block 4, and the graduated housing 5 are square in section, as opposed to the circular section in the first embodiment. Further, the graduated housing 5 includes at least two primary graduations 51 and 51' whereas the indicator block 4 includes at least two auxiliary graduations 41 and 41'. Preferably, the primary graduations 51 and 51' and the auxiliary graduations 41 and 41' are located on different walls (not labeled) of the graduated housing 5 and the indicator block 4, respectively. The primary graduations 51 and 51' and the auxiliary graduations 41 and 41' are of different units, such as metric unit, British unit, Taiwanese unit, etc. The second embodiment of the weight scale with hybrid graduation in accordance with the present invention provides measuring results in different weight units. Further, the sectional shape of the elastic element 1, the supporting housing 2, the indicator block 4, and the graduated housing 5 can be varied according to need, such as elliptic, triangular, rectangular, polygonal, irregular, etc.

Figure 9:
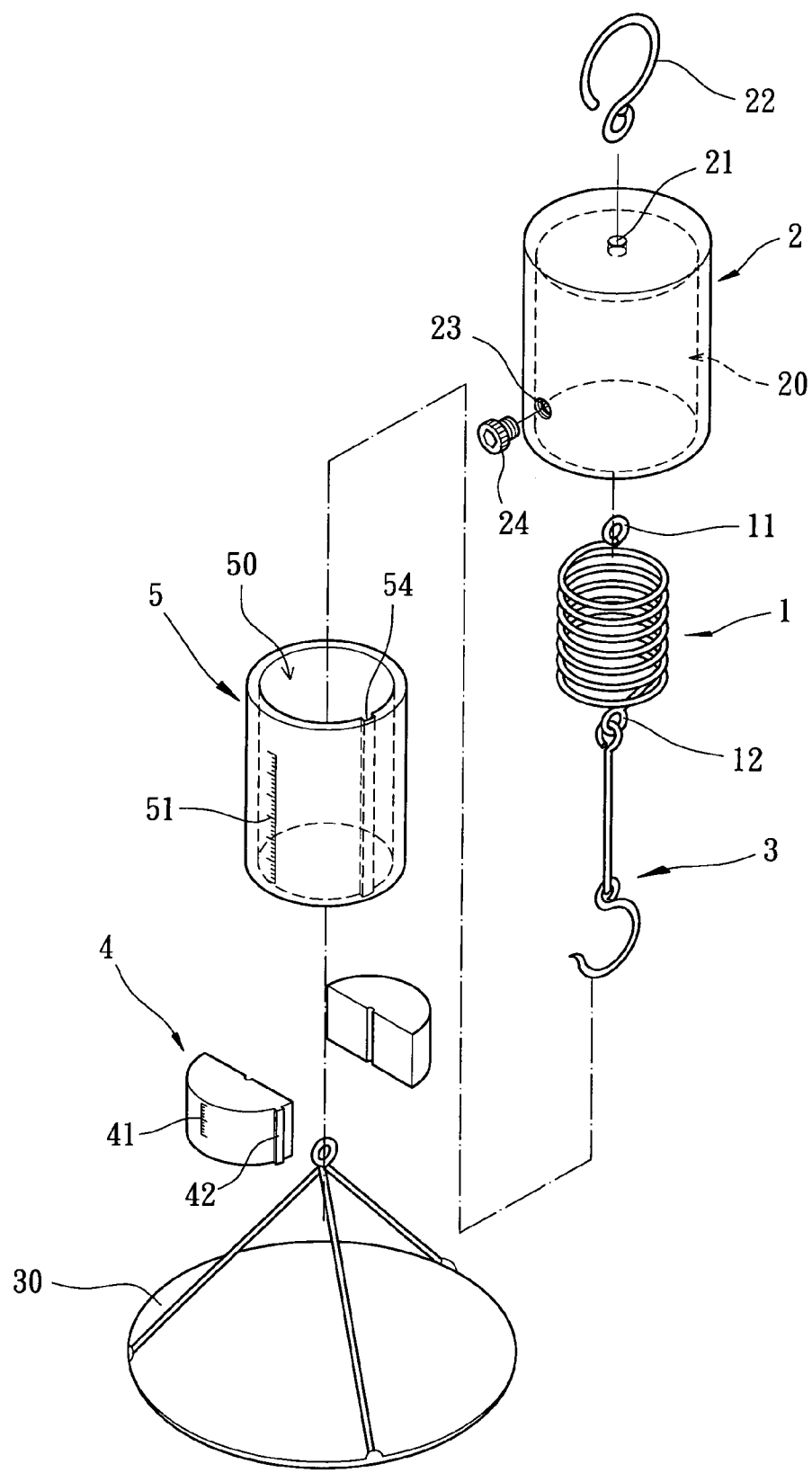
FIG. 9 is an exploded perspective view illustrating a third embodiment of the weight scale with hybrid graduation in accordance with the present invention.
Figure 10:
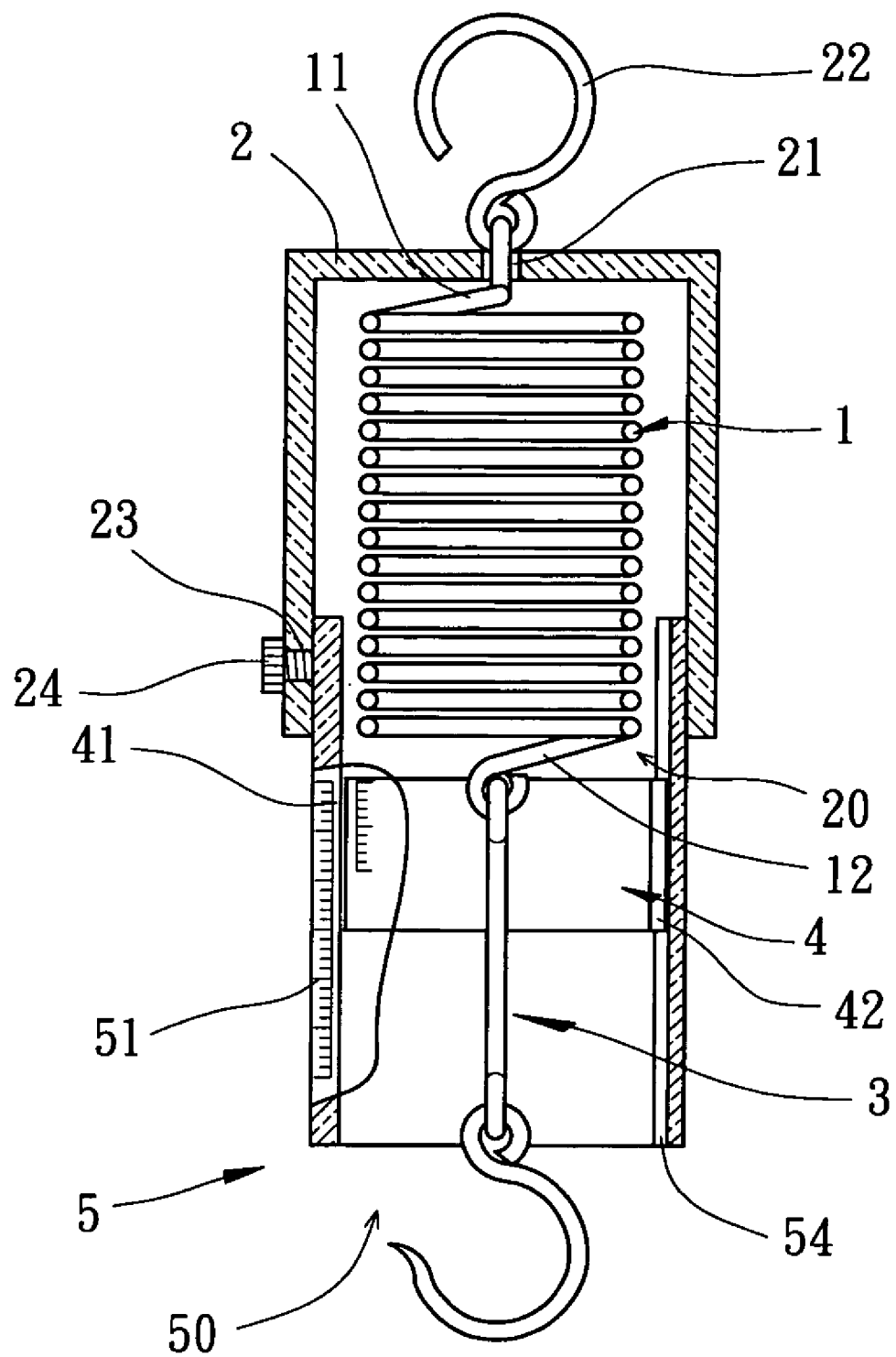
FIG. 10 is a sectional view of the weight scale with hybrid graduation in FIG. 9.

FIGS. 9 and 10 illustrates a third embodiment of the weight scale with hybrid graduation in accordance with the present invention. In this embodiment the supporting housing 2 is mounted around the graduated housing 5 whereas the graduated housing 5 in the first and second embodiments is mounted around the supporting housing 2. Namely, the graduated housing 5 in this embodiment is mounted between the supporting housing 2 and the elastic element 1. In this case, the supporting housing 2 includes a positioning hole 23 through which a positioning member 24 extends for frictionally retaining the graduated housing 5 in place. A similar measuring effect is thus obtained.

As apparent from the foregoing, the weight scale with hybrid graduation in accordance with the present invention allows more accurate measurement of the object with a precision smaller than one unit M of the primary graduation 51. Further, zeroing can be carried out. Further, the number of elements of the weight scale with hybrid graduation in accordance with the present invention is less than that of the conventional designs, allowing easy assembly while providing a simplified structure.

While the principles of this invention have been disclosed in connection with specific embodiments, it should be understood by those skilled in the art that these descriptions are not intended to limit the scope of the invention, and that any modification and variation without departing the spirit of the invention is intended to be covered by the scope of this invention defined only by the appended claims.

What is claimed is:

1. A weight scale with hybrid graduation comprising:
an elastic element having a lower end, a carrier being mounted to the lower end of the elastic element;
an indicator block mounted between the elastic element and the carrier, the indicator block comprising at least one auxiliary graduation; and
a graduated housing for receiving the elastic element and the indicator block, the graduated housing comprising at least one primary graduation;
said at least one primary graduation having a unit different from that of said at least one auxiliary graduation;
a weight of an object attached to the carrier being measured through vertical relative movement between said at least one primary graduation and said at least one auxiliary graduation.

2. The weight scale with hybrid graduation as claimed in claim 1, further comprising means for zeroing the weight scale.

3. The weight scale with hybrid graduation as claimed in claim 2, wherein said means for zeroing the weight scale comprises a supporting housing mounted around the elastic element, the supporting housing including an upper end coupled to an upper end of the elastic element, the supporting housing being movable relative to the graduated housing along a vertical direction, further comprising a positioning member for retaining the graduated housing on the supporting housing, thereby proceeding with zeroing through adjustment of relative vertical position between the graduated housing and the supporting housing.

4. The weight scale with hybrid graduation as claimed in claim 3, wherein the supporting housing, the elastic element, and the indicator block are received in the graduated housing.

5. The weight scale with hybrid graduation as claimed in claim 4, wherein the graduated housing comprises a positioning hole through which the positioning member extends.

6. The weight scale with hybrid graduation as claimed in claim 3, wherein the graduated housing is mounted between the supporting housing and the elastic element, and wherein the indicator block is received in the supporting housing.

7. The weight scale with hybrid graduation as claimed in claim 6, wherein the supporting housing comprises a positioning hole through which the positioning member extends.

8. The weight scale with hybrid graduation as claimed in claim 1, wherein the graduated housing is transparent or translucent to allow reading of said at least one auxiliary graduation of the indicator block in the graduated housing.

9. The weight scale with hybrid graduation as claimed in claim 1, wherein the graduated housing comprises a vertical slot to allow reading of said at least one auxiliary graduation of the indicator block in the graduated housing.

10. The weight scale with hybrid graduation as claimed in claim 1, wherein each of the elastic element, the indicator block, and the graduated housing includes a sectional shape that is circular, elliptic, rectangular, triangular, polygonal, or irregular.

11. The weight scale with hybrid graduation as claimed in claim 3, wherein each of the elastic element, the supporting housing, the indicator block, and the graduated housing includes a sectional shape that is circular, elliptic, rectangular, triangular, polygonal, or irregular.

12. The weight scale with hybrid graduation as claimed in claim 1, wherein said at least one primary graduation and said at least one auxiliary graduation are selected from a group consisting of British unit, metric unit, and Taiwanese unit, and combinations thereof.

13. The weight scale with hybrid graduation as claimed in claim 1, wherein a weight (W) of the object weighed by the weight scale is expressed as follows:

$$W = L1 + (m/n)*M$$

wherein L1 is a precise graduation value read by a user's eyes from said at least one primary graduation;

M is one unit of said at least one primary graduation;

m: a mark on said at least one auxiliary gradation is aligned with a mark on said at least one primary graduation mark to appear a graduation value; and n fulfills the following equation:

$$(n-1)*M = n*N$$

wherein N is one unit of said at least one auxiliary graduation.

14. The weight scale with hybrid graduation as claimed in claim 1, wherein the graduated housing comprises a longitudinal groove in an inner wall face, and wherein the indicator block comprises a longitudinal rib on an outer wall face thereof and slidably engaged in the longitudinal groove.

* * * * *